S. M. CUTTER.
HORSE NAIL MACHINE.
APPLICATION FILED FEB. 21, 1911.

1,166,890.

Patented Jan. 4, 1916.
11 SHEETS—SHEET 2.

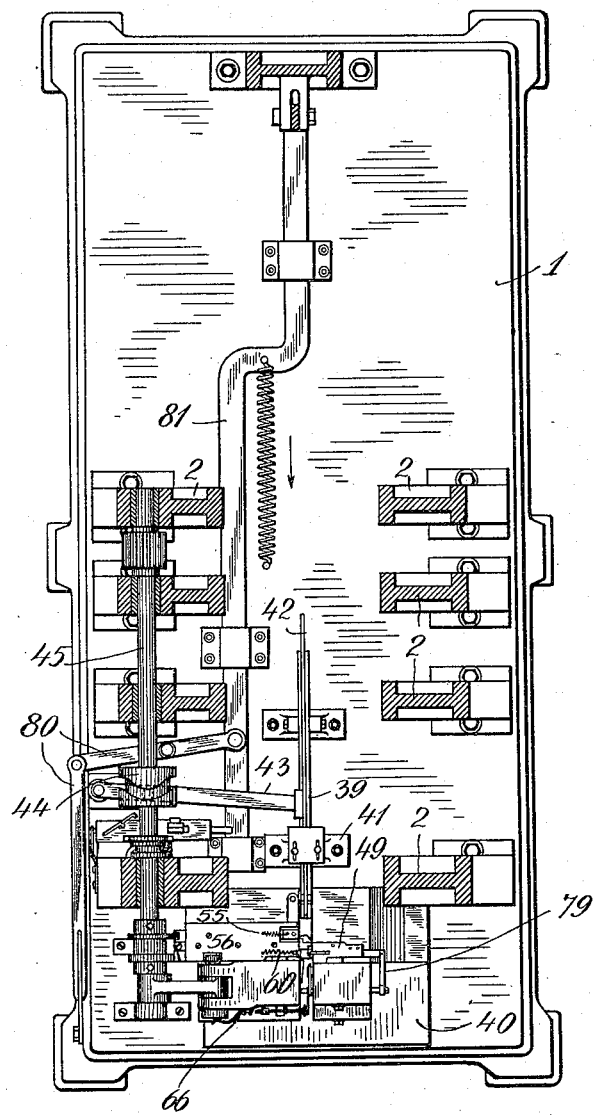

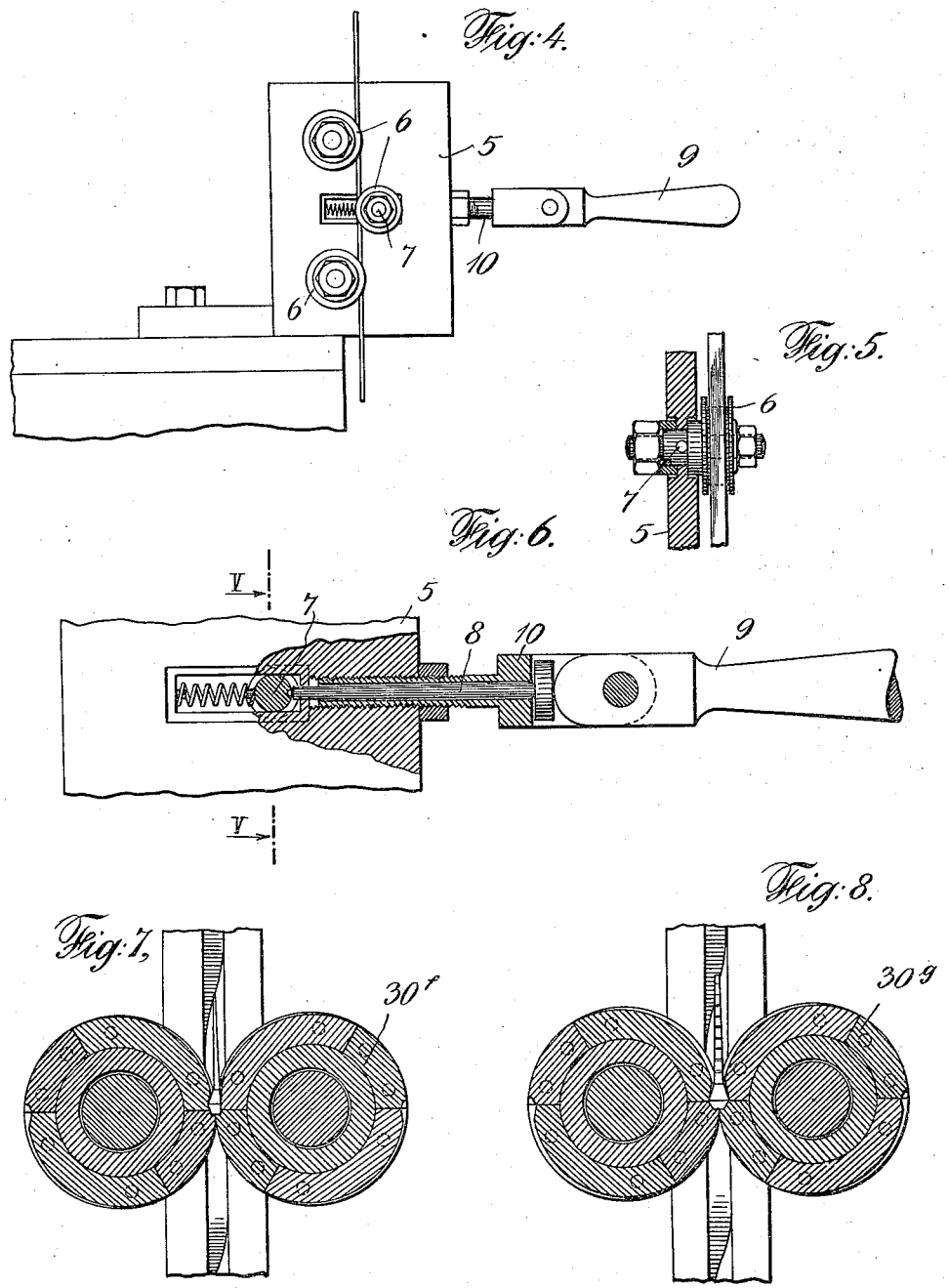

S. M. CUTTER.
HORSE NAIL MACHINE.
APPLICATION FILED FEB. 21, 1911.
1,166,890.
Patented Jan. 4, 1916.
11 SHEETS—SHEET 5.
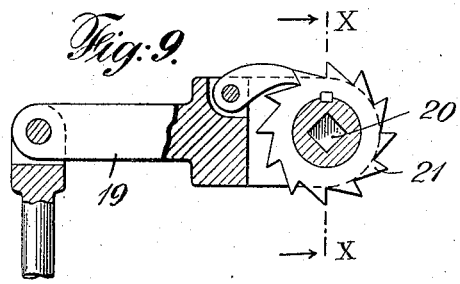
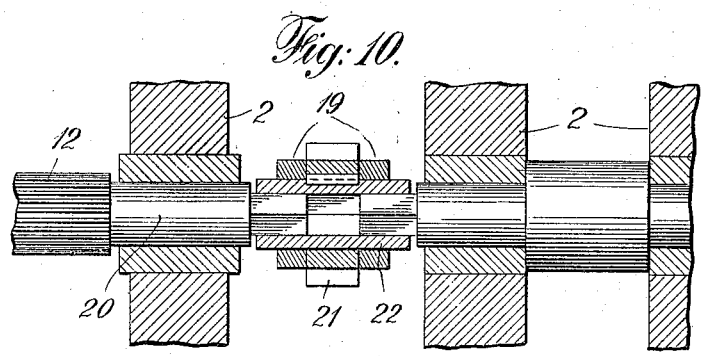
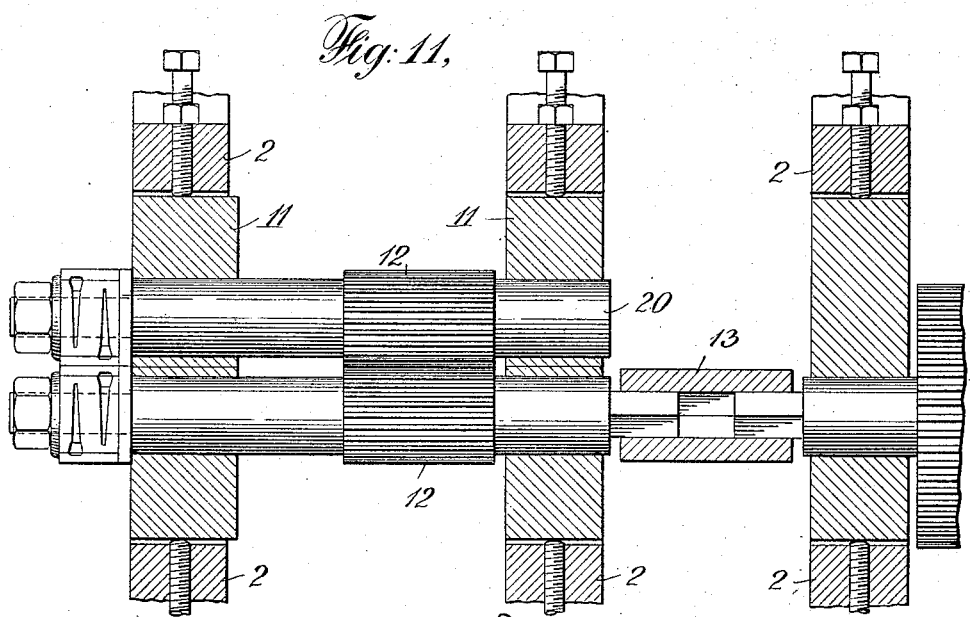
COLUMBIA PLANOGRAPH CO., WASHINGTON, D. C.

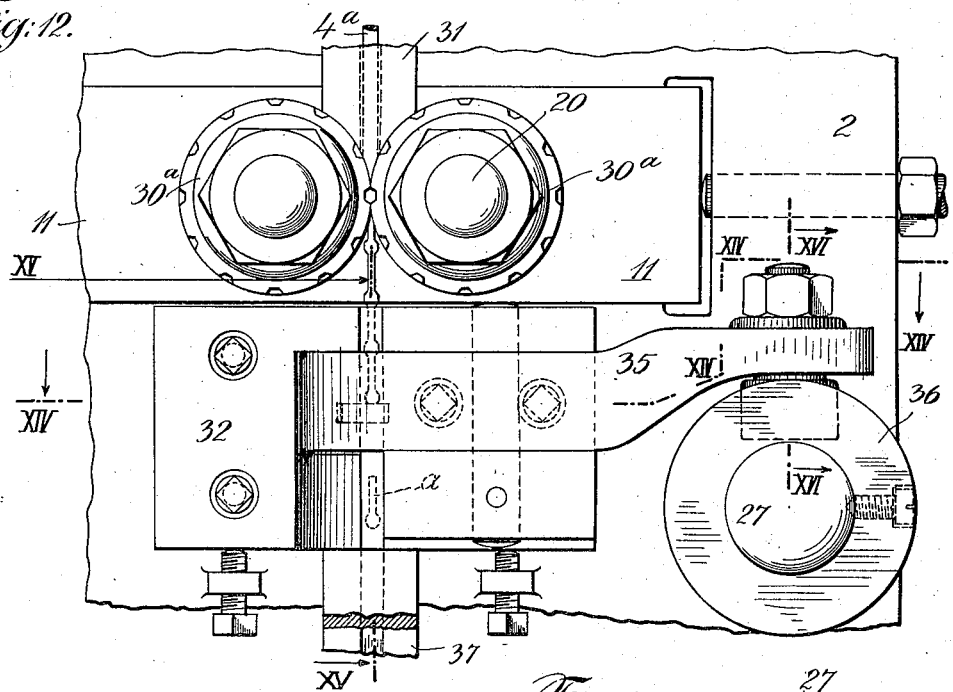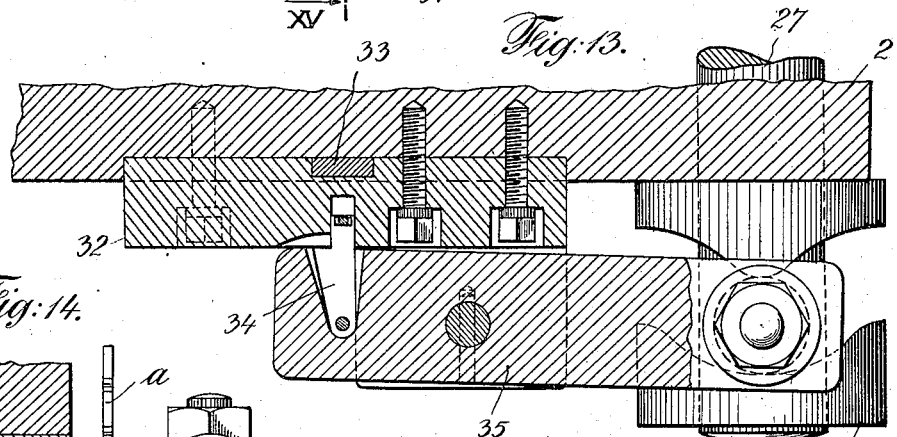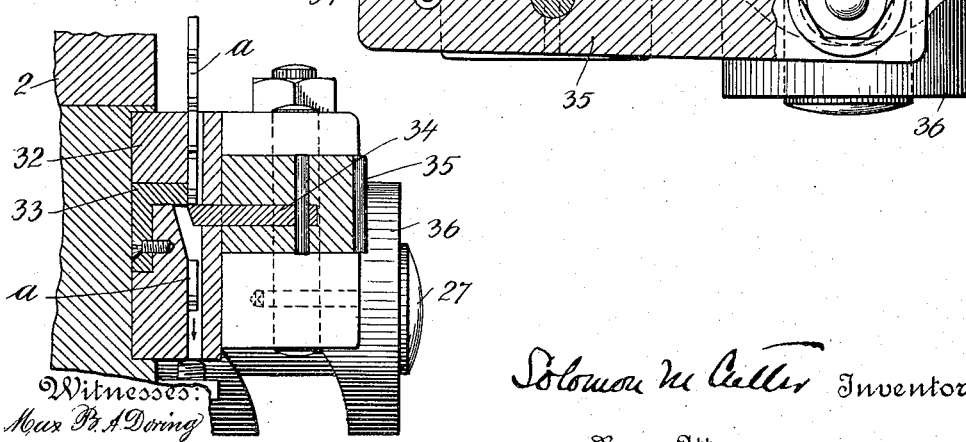

S. M. CUTTER.
HORSE NAIL MACHINE.
APPLICATION FILED FEB. 21, 1911.

1,166,890.

Patented Jan. 4, 1916.
11 SHEETS—SHEET 7.

Witnesses:
Solomon M. Cutter
Inventor

By Attorney

S. M. CUTTER.
HORSE NAIL MACHINE.
APPLICATION FILED FEB. 21, 1911.
1,166,890.
Patented Jan. 4, 1916.
11 SHEETS—SHEET 8.
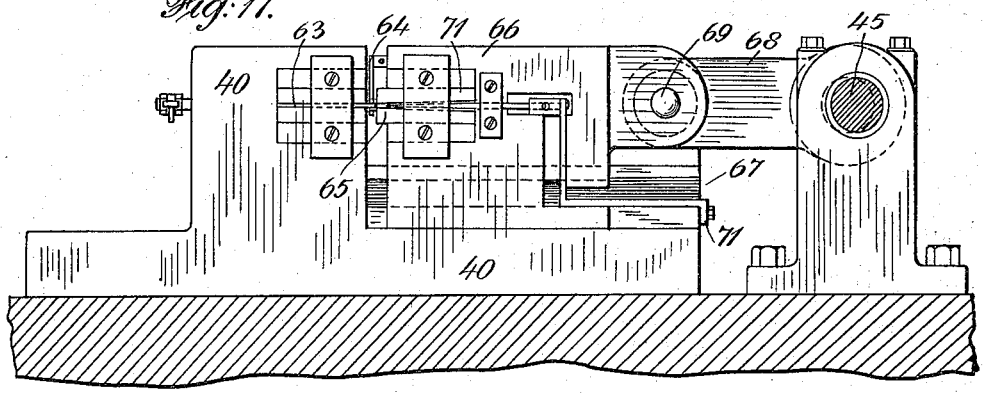
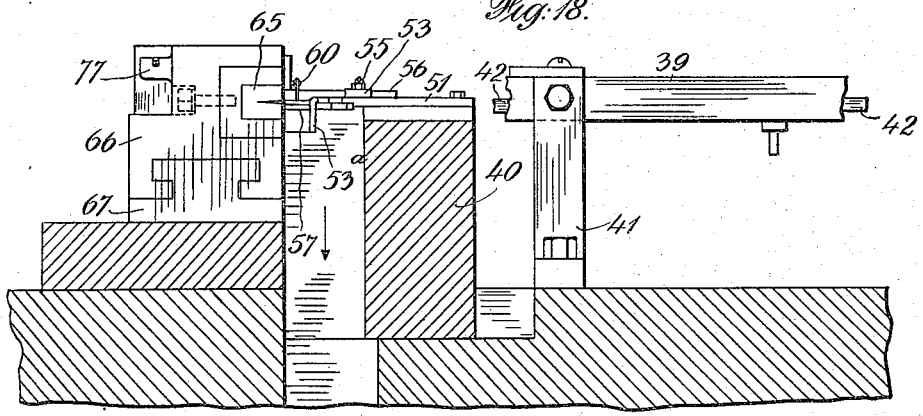
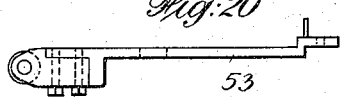

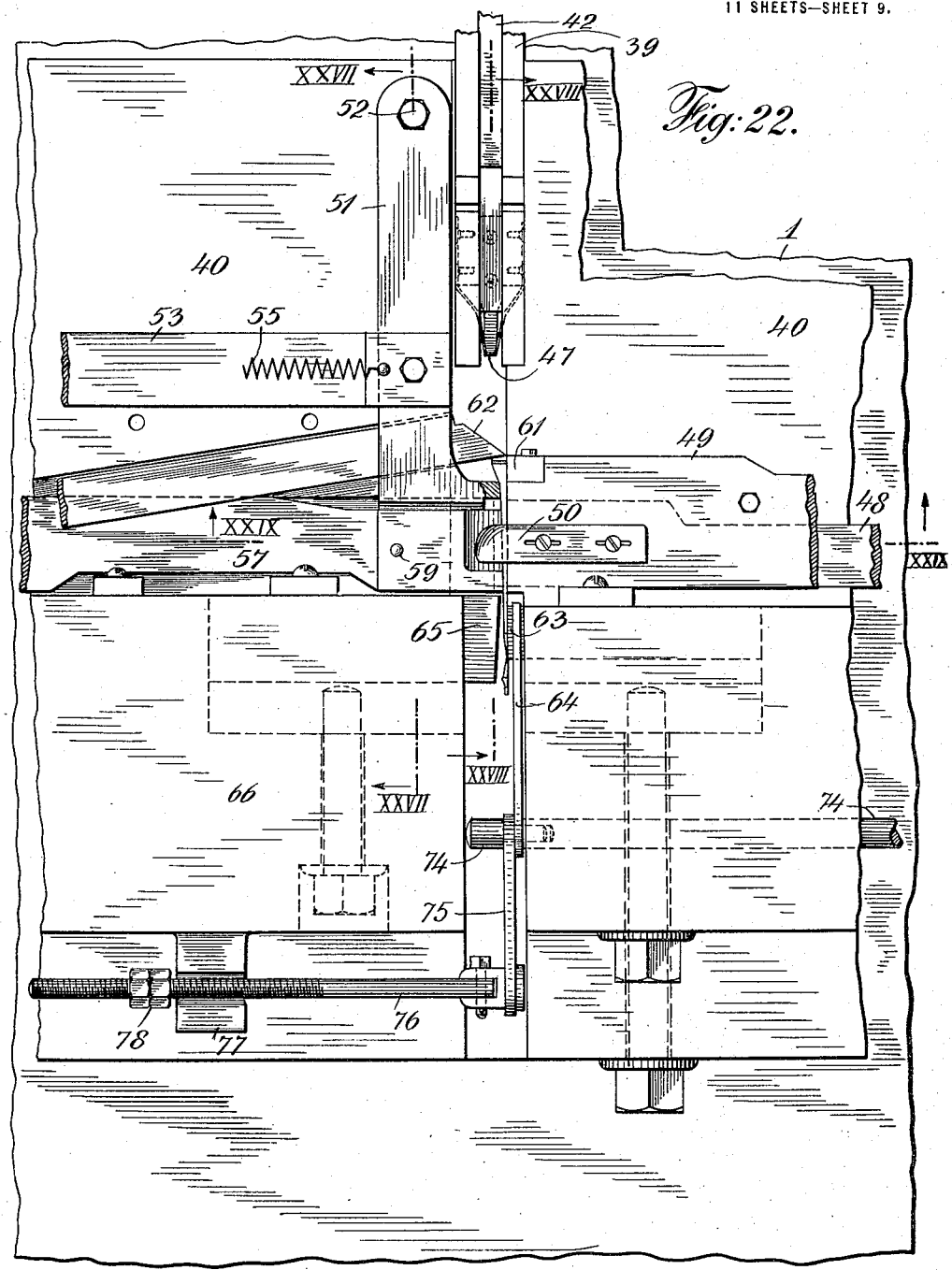

S. M. CUTTER.
HORSE NAIL MACHINE.
APPLICATION FILED FEB. 21, 1911.
1,166,890.
Patented Jan. 4, 1916.
11 SHEETS—SHEET 10.
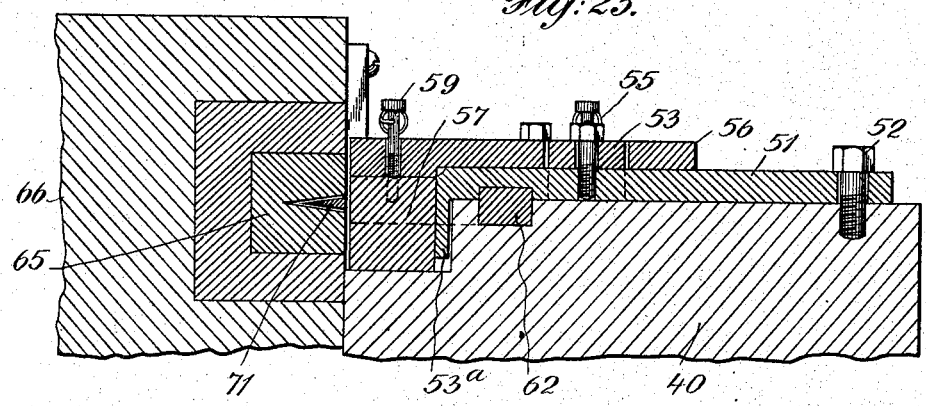
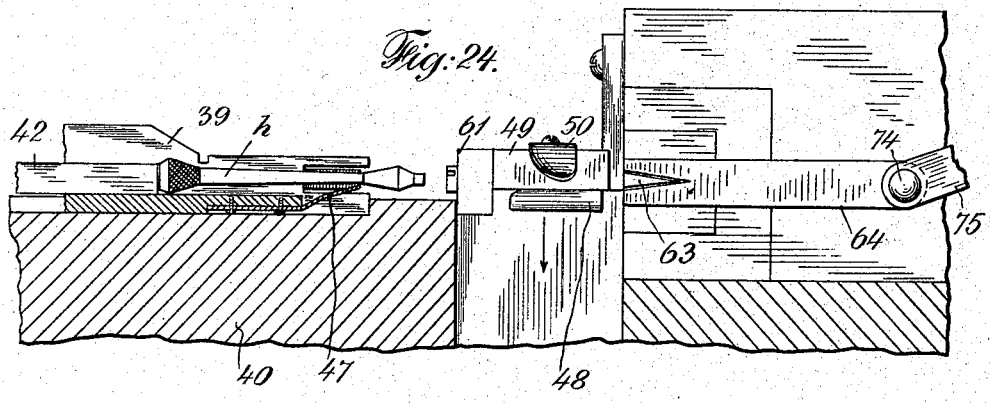
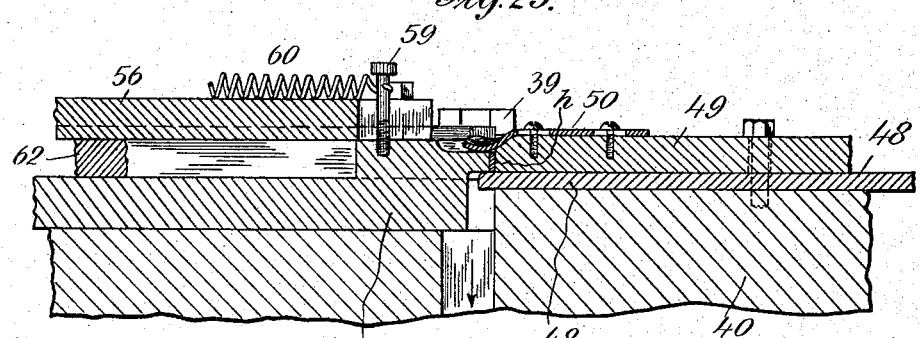

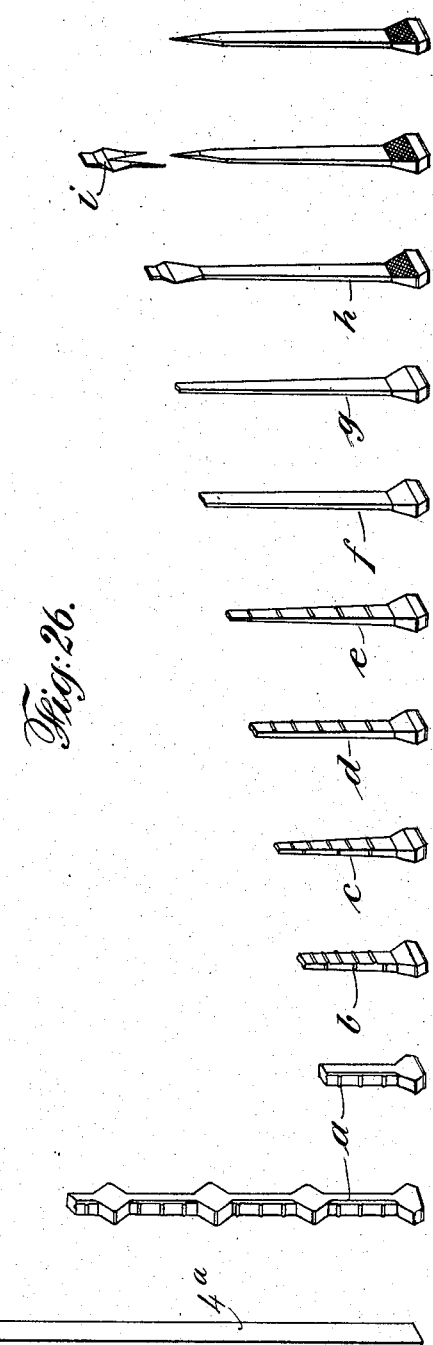

UNITED STATES PATENT OFFICE.

SOLOMON M. CUTTER, OF HARTFORD, CONNECTICUT, ASSIGNOR TO THE CAPEWELL HORSE NAIL COMPANY, OF HARTFORD, CONNECTICUT, A CORPORATION OF CONNECTICUT.

HORSE-NAIL MACHINE.

1,166,890.  Specification of Letters Patent.  Patented Jan. 4, 1916.

Application filed February 21, 1911. Serial No. 609,979.

*To all whom it may concern:*

Be it known that I, SOLOMON M. CUTTER, a citizen of the United States, residing at Hartford, county of Hartford, State of Connecticut, have invented certain new and useful Improvements in Horse-Nail Machines, of which the following is a full, true, and concise specification.

My invention aims to simplify the construction and improve the general efficiency of machines for making horse-nails and has particular reference to the type of horse-nail machines in which the entire series of operations that are necessary to convert a continuous wire stock to finished nails is accomplished by the operation of a single organization of parts.

The invention consists in the general construction and mode of operation of such parts adapted to accomplish this purpose with rapidity and accuracy, as well as in the structure and arrangement of the specific parts and combinations and sub-combinations thereof, as will fully appear from the description given below and be more fully pointed out in the appended claims.

Figure 1:
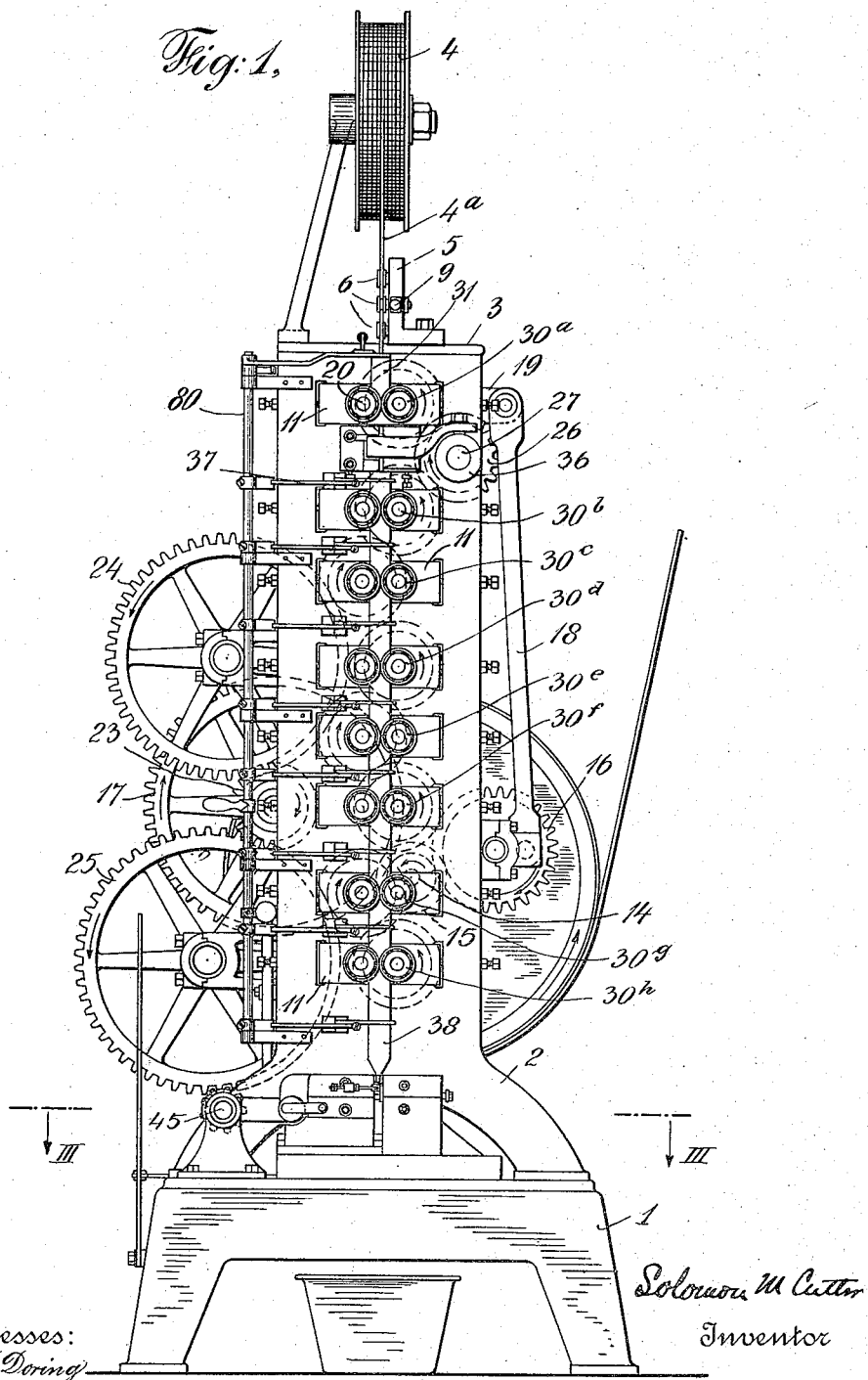
Figure 2:
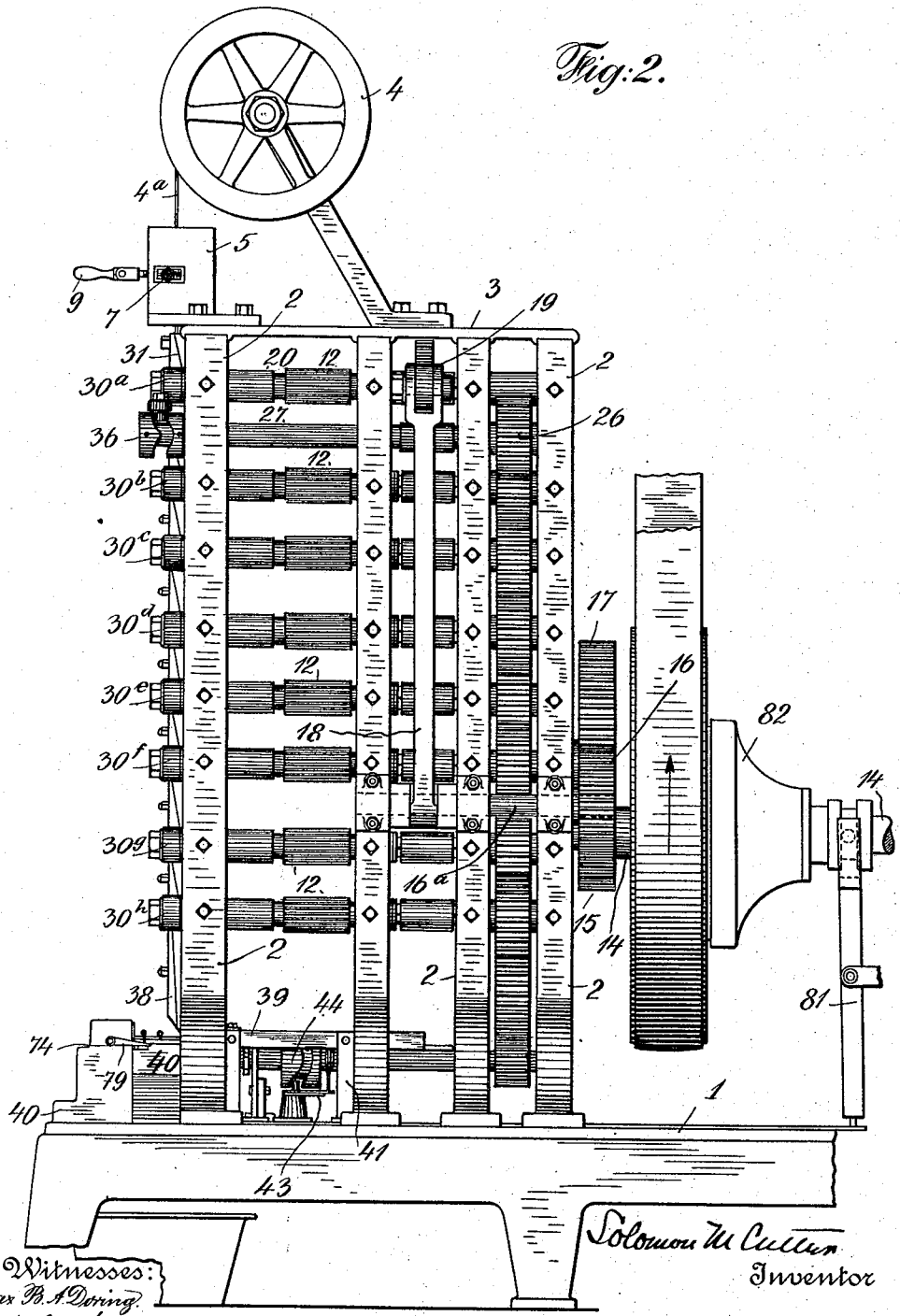
Figure 15:
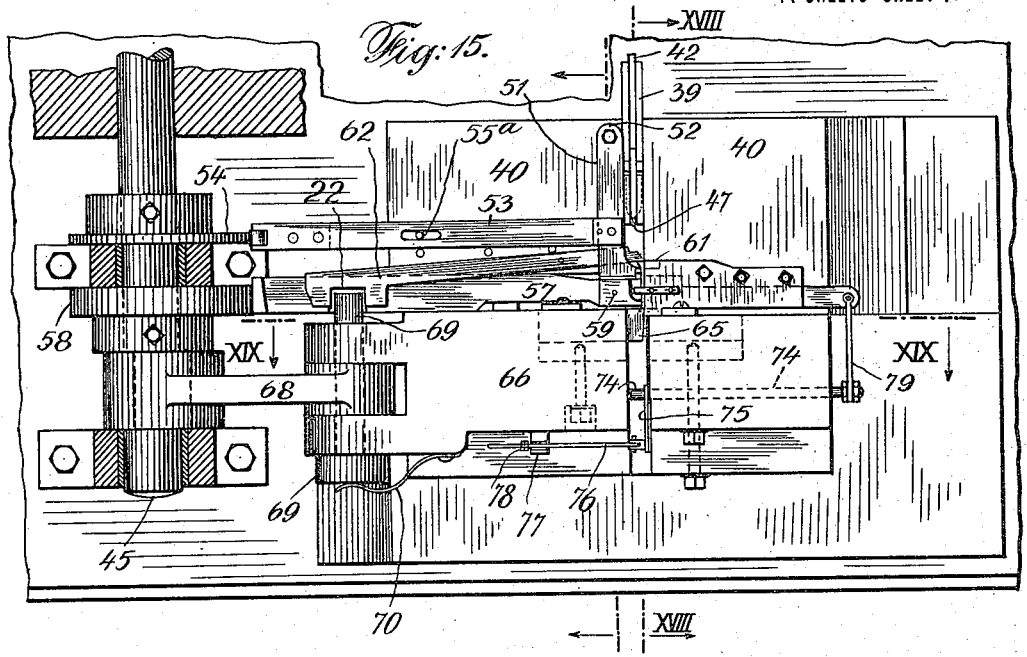
Figure 16:
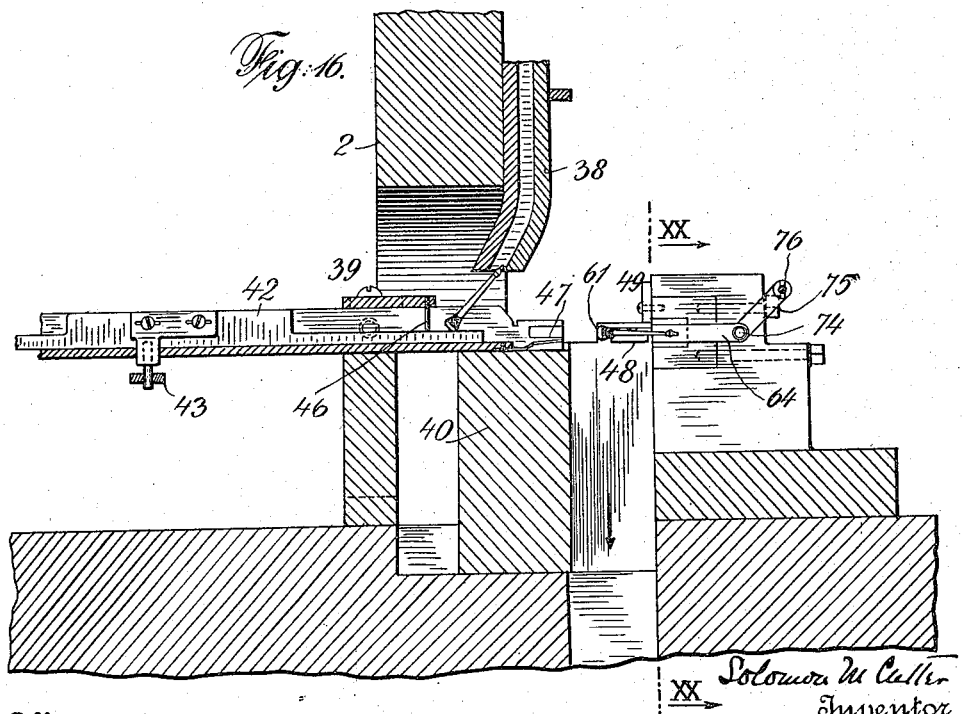

In the eleven sheets of drawings forming part hereof, Figure 1 is the vertical front elevation of a horse-nail machine embodying the invention; Fig. 2, a side elevation thereof; Fig. 3, a horizontal section on the line III—III of Fig. 1 in the direction of the arrows; Fig. 4 is a side elevation in detail of the rod or stock straightener; Figs. 5 and 6 are respectively enlarged details, partly in section, of parts of the straightener; Figs. 7 and 8 are details illustrating the manner of passage of the nail blanks from one pair of die-rolls to the next; Fig. 9 is an enlarged detail, partly in section, of the ratchet drive for the initial die-rolls; Fig. 10 is a section on line X—X of Fig. 9: Fig. 11 is a horizontal enlarged section of two of the die-rolls illustrating their mode of support and actuation; Fig. 12 is an enlarged detail elevation of the initial power and die-rolls of the shearing mechanism; Fig. 13 is a section of Fig. 12 on lines XIV—XIV; Fig. 14 is a section on line XV—XV of Fig. 12; Fig. 15 is a detail plan with parts in section on a slightly larger scale than Fig. 3 of the operative mechanism by which the nail is finished. In this figure the cover plate 56 is removed in order to disclose the parts beneath. Fig. 16 is a vertical section of Fig. 12 on line XVIII—XVIII of Fig. 15, showing also the rearwardly curved delivery chute; Fig. 17 is a vertical elevation of the point trimming mechanism by itself, as appears by section line XIX—XIX in Fig. 15; Fig. 18 is part sectional and part elevation view of Fig. 15 on lines XVIII—XVIII but taken in the opposite direction from that of Fig. 16; Fig. 19 (comprising two parts) represents the seating tool removed; Fig. 20 the actuating rod of the seating stop removed; Fig. 21 (comprising two parts) represents the seating stop itself; Fig. 22 is a further enlarged detail plan, with parts broken away and in section, of the several finishing tools and the trimming seat; Fig. 23 is a sectional view of Fig. 22 on line XXVII—XXVII thereof and on the same scale; Fig. 24 a similar section of the same figure on line XXVIII—XXVIII; Fig. 25 a similar section of the same figure on line XXIX—XXIX; Fig. 26 is a diagram representing the successive stages of the nail blank between the full size stock $4^a$ and the finished nail.

The machine frame comprises a bed-plate 1 mounted on legs and supporting four parallel upright frames 2, joined at the top by the crown plate 3. The nail-stock, in continuous rod form is marked $4^a$, and is supplied from a reel 4, which is mounted on a bracket above or upon the crown plate, in such position that it may deliver the nail stock downwardly to the straightener 5, and thence, in a substantially vertical direction, to the series of die-rolls by which the stock is reduced to nail form.

The straightener 5 consists of the usual set of three grooved rollers, each of which is marked 6 and shown more clearly in Figs. 4, 5 and 6. The axle 7 of the intermediate roller is carried in a horizontal slideway in the frame or plate of the straightener and held in its working position therein by means of a plunger 8 which thrusts at its outer end against a cam formed on the end of the hand lever 9. The operation of the hand lever shifts the relation of the cam and thereby releases the plunger, allowing it and the intermediate roller to recede from the path of the nail stock under the influence of a spring provided for that purpose. The passage between the rollers is thus adapted to be opened to permit the insertion of the nail stock rod. The support of the plunger 8 and hand lever 9 is formed, in the present instance, as a tubular threaded bushing 10, within the hole in which the plunger 8 is confined, and is thus adjustably mounted with respect to the movable roller so as to enable its working position to be properly set with relation to the other two, this adjustment being accomplished by screwing the support in or out, as desired, and setting it by means of the lock-nut.

The several die-rolls by which the stock is reduced to nails, project in pairs from the vertical face of the foremost frame upright, being journaled in the bearings 11 in this foremost upright and in the one next behind it (Fig. 11). These bearings are capable of lateral adjustment in the manner indicated, in order to vary the width of the pass between the rolls. The shafts of each pair of die-rolls are geared to rotate in unison by means of their intermeshing pinions shown at 12 in Figs. 2 and 11, and one of the shafts for each pair is extended rearwardly for connection, through a box coupling 13 (Fig. 11), with one of the members of the train of gears by which the die-roll system is driven. The relation of the gears which constitutes this train is not an essential part of this invention, being quite the same as already in use in certain machines of this class. It is indicated in Fig. 2, and more clearly by the dotted lines in Fig. 1, wherein it will be seen that the main drive shaft 14 carries a pinion 15 which meshes on one side with a crank-shaft gear 16 and on the other with a larger gear 17. The crank-shaft gear 16 is carried on a short crank-shaft 16ª, the crank of which is connected by the rod 18 to oscillate a ratchet-wheel pawl-lever 19, which in turn imparts a step-by-step rotation to the die-roll shaft 20 of the uppermost pair of die-rolls 30ª, these being the first rolls in the series which act on the nail-stock. As shown more clearly in Figs. 9 and 10, the pawl lever 19 is straddled over its ratchet wheel, marked 21, and journaled on the sleeve 22 which is placed on the end of the die-roll shaft 20. The ratchet wheel in the present instance has twelve teeth corresponding to the number of nail-blank die-grooves engraved on the periphery of the first pair of die-rolls, and therefore imparts a one-twelfth revolution to these rolls for every complete revolution of the crank-shaft gear 16.

The shaft of the large gear 17, described above as driven by the drive-pinion 15, carries a pinion 23 meshing with two large idler gears 24 and 25. The uppermost of these idlers drives the die-roll pinion of the third pair of die-rolls, and through it the pinion of the second pair, and this pinion, in turn, drives the pinion marked 26, which is the driving gear of the shear-driving cam-shaft 27, referred to below. The same large idler 24 also drives the pinion of the fifth pair of die-rolls, and this pinion meshes both with that of the fourth and sixth die-rolls, so that all of the die-rolls from the second to the sixth in the series are driven by the uppermost of the two large idlers. The lower large idler 25 meshes with the pinion of the seventh pair of die-rolls, which pinion drives that of the eighth pair, and thus completes the train of gearing whereby the die-rolls from the second to the eighth and last, all receive a continuous and equal motion in a forward direction. Each of these die-rolls makes one complete revolution to one of the one-twelfth step-by-step motions of the first pair of die-rolls, as will be plain from a consideration of the dotted pitch line-circles shown in Fig. 1.

It is characteristic of the present machine and invention that the raw nail-stock has a cross-sectional area substantially equal to that of the finished nail-head at its thickest point, and that all the operations performed thereon by the succession of die-rolls above referred to, are in the nature of reducing operations acting to attenuate the portions of the stock that go to make up the shanks or blades of the finished nail, but merely giving shape to the parts which form the heads, without increasing the thickness or cross-sectional area of the stock at any point. By reason of this fact the hammer mechanism heretofore and generally employed for making a head by upsetting and enlarging the end of a nail blank and also the so-called heading-plate and all its correlated mechanism for moving such blanks from one tool to another as well as other familiar but complicated parts, are absent from the new machine, resulting in a corresponding and obvious enhancement of its efficiency and its reliability of action. The particular advantage of the new machine, however, lies in the greater rate of speed at which it can be run, due to the elimination of these massive reciprocating members and particularly to the elimination of the blank carrier mechanism, which not only requires to be stopped and started for each nail produced, as is well known to those skilled in this art, but also to be specially locked at each of its pauses. According to this invention, the strip of nail stock, having the general cross-sectional shape and size of the product nail heads, as just explained, is moved or drawn by the initial pair of die rolls, these being intermittently driven rolls, marked 30ª, from the straightening rolls 6 through a guide tube 31, (Figs. 1 and 12), and is thence projected into the action of the shearing mechanism. In passing through the initial rolls, the stock receives its first reducing operation, which gives it the configuration shown in Figs. 12, 13 and 14.

The shearing mechanism comprises a channeled bracket or support 32, adjustably bolted to the machine frame with the channeled passageway therein disposed in a position directly beneath the die-rolls 30ª, to receive and guide the projecting end of the nail stock as it emerges therefrom in its partially formed condition. On the rear side of its channel, the bracket holds a shear edge 33 (Fig. 14) against which the reciprocating shear 34 is adapted to operate. The latter is borne on the end of the shear lever 35, fulcrumed on the bracket and oscillated by the shear cam 36, which cam is secured upon the end of the cam shaft 27 above mentioned and receives a continual motion from the gearing above described. The actions of the shear cam and intermittent die roll 30ª are properly correlated as will be seen in the drawings, so that the shear advances to action immediately following the intermittent delivery of the partially reduced nail stock, cutting off the end of the latter just below one of the enlargements thereof, representing its head. The section or nail blank thus severed, and appearing as shown at $a$, falls from the shearing channel into a tube section 37, from which it enters the pass of the second pair of die rolls 30ᵇ, receiving a quarter turn in its descent, given to it by the internal shape of the channel within the tube 37. By the second die-rolls, the shank portion of the blank $a$ is further reduced to the form shown by $b$, (Fig. 26), and again falls, on emerging from these rolls, through another section of guide tube, like that marked 37, into the next pair of rolls, marked 30ᶜ, receiving a further reduction as shown at $c$, and from thence into the next rolls 30ᵈ, becoming thereby shaped like $d$, and so on through the successive tube sections and die-rolls (30ᵉ, 30ᶠ, 30ᵍ and 30ʰ), receiving from each the changes in shape indicated by the blanks $e$, $f$, $g$, and $h$, until it reaches the final or delivery tube section 38, through which it passes, head first, to the drive-in trough 39. The terminal pair of die-rolls 30ʰ is equipped with die cavities equal in size and shape to that of the finished nail so that, as will be observed from the drawings, they produce a horse-nail $h$ of the size and substantially the exact shape of the finished nail, and with a full sized and properly shaped head, but the head has an irregular surface on its top, the result of the rolling operation, and the other end, representing the point of the nail, is spatulate rather than pointed, although it has the proper thickness for a point, and is also properly beveled. The succeeding reducing operations required to produce the finished nail are merely those of shearing off the irregularities from the top of the head and trimming off the surplus metal, as shown at $i$ in Fig. 26, from the point, and also of giving the nail its final set. The nature of these operations is such that they may be performed simultaneously, and while the nail is held fixed in one position, from which position it falls, a finished nail, into the nail box beneath the bed plate.

In passing from each successive pair of die-rolls to the next the nail blank receives a quarter turn, as described above in connection with the guide tube 37. Figs. 7 and 8 illustrate the relation which the blank assumes with respect to two successive rolls, as for instance 30ᶠ and 30ᵍ, the interior of the guide tubes being also shown.

Referring now to the finishing mechanism, the drive-in trough 39 is mounted on the pedestals 41 (Fig. 3), with its forward end supported on a suitable bed-block 40 just beneath the delivery tube 38. It consists of a channeled tube or U-shaped trough, containing a reciprocating pusher 42 which is operated by the cam lever 43 of a cam 44, the latter being on the cam shaft 45, which shaft is driven, as shown, from the lower idler 25, and at a suitable rate to cause one complete reciprocation of the pusher for every complete revolution of the die-rolls; that is to say, for every nail produced and delivered through the delivery tube 38. The delivery tube is curved rearwardly so that the nail $h$ is laid on the top of the pusher with its head to the rear and while the pusher is in its forward position. The nail thus rests on the pusher by the narrow edge of its head, as shown in Fig. 16. By the ensuing rearward motion of the pusher, the point of the nail is drawn from the tube, if it has not already fallen therefrom, and then rides rearwardly on top of the pusher until it encounters the fixed overhanging stop 46 (Fig. 16) by which it is held from further rearward movement while the pusher draws from under it, allowing the nail to drop upon the bottom or floor of the drive-in trough. In this position and still resting on its narrow side, it remains until the pusher again advances and thrusts it, point foremost, through the set of converging fingers 47, with which the end of the drive-in trough is equipped, and thence into the seat upon which it is to be held while undergoing its further treatment. The fingers 47, are flat springs, three in number, mounted in projecting relation upon the bottom and sides of the drive-in trough and are adapted to maintain the direction of the nail as it leaves the trough and enters its seat, and also to allow the pusher to follow through after the nail to a sufficient extent to place it firmly and fully against the seating stop provided for the purpose. The seat on which the nail is trimmed and finished, is formed in part by the vertical face of a plate or block 49, which is secured to the top of a bed block 40 on the frame and in substantial alinement with the pusher and nail and on the side thereof which is proximate to the flat side of the nail. The seat also comprises the face of a fixed pointing die 63 referred to below.

Directly beneath the vertical face of the block 49 there is mounted a horizontal slide 48, the end of which normally projects from the vertical face of the plate forming a shelf or ledge to receive and support the nail during its movement to seating position and while the clamp and setting tool, later described, is moving into action. The slide 48 is confined in its slideway in the bed-block by means of the plate 49 which is bolted over it, and it is also provided with suitable connections at its rear, whereby it may be moved to cause the ledge or shelf to recede within the plate 49, and thus allow the nail, when finished, to drop through the hole in the bed-plate into the nail box. The upper margin of the shelf nearest the drive-in trough is preferably sloped or beveled, as shown, in order to facilitate the movement of the blank into position thereon.

The position of the nail when resting upon the ledge 48 and against the vertical face of its seat, is further defined and determined by a curved finger 50, which is a spring finger secured to the plate 49 with its end overhanging the vertical seating face thereof and shaped to provide an easy movement for the spatulate point of the nail into its fully seated position. Its effect is primarily to keep the nails from turning on their own longitudinal axes as they move to position, so that they will all be held with their flat sides against the vertical seating face.

The stop which limits the longitudinal movement of the blank between the shelf and spring finger, is mounted on one of the bed-blocks 40 that is disposed directly opposite the vertical face of the nail seat, and is arranged to be moved toward the nail seat coincidentally with the placing of the nail thereon, arriving in its effective position for this purpose slightly before the pusher has completed its pushing or feeding stroke. This stop, in the present case, has the form of a lever, as shown at 51 in Figs. 15, 21, 22 and 23, pivoted at the point marked 52 which it will be noted, is in the rear of the trimming seat, or on the same side thereof from which the nail enters, and also fairly close to the path of movement of the pusher, so that the free end of the lever swings substantially perpendicular to the plane of the trimming or finishing seat. The stop lever is operated by a cam-rod 53 (Fig. 20) from a cam 54 on the cam shaft 45, referred to above, the cam-rod and lever being covered so as to be protected and held in place by a removable casing or plate 56. As shown more clearly in Fig. 23, the free end of the stop-lever is provided with a depending lip 53$^a$ accommodated in a recess in the bed block, and this lip portion extends laterally and at right angles from the body of the lever and vertical face of its bed block support, projecting to a position where the vertical edge thereof, which is nearest the drive-in trough, will be spaced from the vertical face of plate 49 by a distance exactly equal to the thickness of the nail shank just beneath its head. This is the effective position of the stop, indicated in Fig. 22, to which it is moved as or before the nail enters its seat. When the pusher advances the nail, the point thereof passes through the crevice between the lip 53$^a$ and the vertical face of the seat until the corner angle at the junction of its head and shank makes contact with the edge of the lip, which is nearest the pusher, becoming thereby abruptly and positively arrested in a position which has been properly predetermined with respect to the trimming tools. This mode of stopping and determining the position of the nail is superior to previous methods wherein the stop members are provided with sloping abutment faces adapted to be encountered by the sloping sides of the nail heads, because, as will be observed, by definitely fixing the position of the base of the head i. e., corner angle above referred to, with respect to the trimming tools, the finished nails will not only have a uniform total length, but will also all have the same proportional lengths of heads and shanks. This is not the case with the previous stop members of the kind referred to, wherein, as is well known, the relative lengths of heads and shanks are likely to vary although the overall length may remain the same. The seating stop lever arranged to operate in the above manner, is preferably moved into its effective position by a cam as stated, but it could be stationary or merely spring-held if desired, provided means for forcibly ejecting the nail from its seat should be used instead of depending on gravity alone. In the present case a spring is used for withdrawing the stop and holding its cam-rod against the cam. This spring is marked 55 in Figs. 22 and 23, and appears also in Figs. 3 and 18, being stretched between a post on the stop lever and another post, marked 55$^a$ (Fig. 15) on the bed-block. This latter post rises from the bed-block through a slot in the cam-rod whereby the latter is held in guided alinement with its cam. Both posts project through the cover plate 56, and the spring is attached to the upper ends of the posts above the plate. In its fully seated position as arrested by the seating stop, the nail is then pressed firmly against the vertical face of the seat and also against the fixed point-trimming die 63 above alluded to, by means of the clamping or setting tool formed on the end of a cam rod 57, which is actuated by a cam 58 on cam-shaft 45, so that it advances upon the nail immediately as the latter reaches its seat. The nail engaging end of this clamping or setting tool is shown more particularly in Figs. 22 and 25 and also in the detached views of Fig. 19, from which it will be seen that it is fashioned to give clearance to the projecting end of the nail-holding finger 50 on its upper side and also to the disappearing shelf on its lower side, and the portion or surface with which it engages the nail is made in the proper relation to that of the vertical portion of the seat, to straighten the nail, if crooked, or impart to it any desired condition of curvature or so-called set.

The mounting for the setting tool is formed by a channeled groove in the bed block arranged to guide the tool so that it will work closely adjacent to the end of the lip 53ª of the stop lever 51 and its working end, as will be observed is upwardly offset, with respect to the length of its rod so that the level of the latter will be below that of the shearing die 62 presently described. The same plate (56) that covers the seating stop lever, also covers and protects the setting tool, and the spring 60, which maintains it against its cam, is connected above the cover plate between the post 59 on the tool itself and another post (not marked) which is fixed on the top of the cover. The latter post appears only in Fig. 3.

As thus positioned and clamped by the setting tool, the nail lies with its head against a shear edge 61 formed on or secured to the plate 49 or its bed block, and in a position in which the shearing die 62 may advance upon it to trim off the excrescences from its top. The shearing die is mounted in an oblique slideway formed partly in the fixed bed block at the side of and slightly above the setting tool, and partly in a groove in the under side of the stop lever 51, so that it lies obliquely to the axis of the nail, overlying a portion of the setting tool 57, but so that it can act in the same plane as the nail seat, and the other tools, as shown in the drawings. When advanced longitudinally in this slideway the shearing tool trims the head of the nail against the shear edge 61, and at the proper angle to give it the desired top slope, (Fig. 22). While the head is being thus finished, the point of the nail is also being trimmed. For this purpose the point of the seated nail extends beyond the plate 49 and against the face of a fixed point-trimming die 63 which is secured to the bed block adjacent the plate 49, projecting laterally from its supporting means, so that it can accommodate the female pointing die which advances toward and over it, and also the movable stripper 64, by which the surplus metal is discharged.

The female trimming die 65 is carried on a reciprocating slide-head 66, mounted on ways 67 and actuated by an eccentric link connection 68 from the cam shaft 45. In its interior cavity it is provided with an ejector 71 of usual arrangement adapted to free the die of the point of the nail as it recedes therefrom. The pin 69 by which the slide head is coupled to the link 68 is held in place by a pivoted button or holder 70 and projects beyond the opposite, or rear, side of the slide-head far enough to enter a notch 72 in the end of the shearing die, (Fig. 15), so that the motion imparted to the slide head will also be imparted to the shearing die. The head and point-trimming dies are thus adapted to operate in unison and from a common cam on the cam shaft, and it will be noted that the arrangement is such that by the removal of the cover plate 56 and the withdrawal of the pin 69 from its notch in the die, the latter can be readily removed for sharpening.

The stripper 64 is carried by the end of a horizontal push rod or plunger 74 mounted to slide back and forth in its seat in the bed block and arranged to be encountered by the advancing slide-head of the female trimming die 65 so as to move the stripper out of the way of the latter when it moves over the male die to cut the surplus metal from the point. An arm 75 connects the plunger 74 with a pull-rod 76 which is loosely supported in a lateral lug 77 on the slide head. The pull rod carries an adjustable stop 78 adapted to be encountered by the lug as the slide head recedes from the nail, so as thus to restore the rod 74 to its former position, the stripper being thereby brought into action in the obvious manner. The stop 78 is in the form of a nut and lock-nut threaded to the pull rod and is hence adjustable to vary the time and extent of movement of the stripper. At its outer end the plunger 74 bears a rigid, laterally extending arm 79 which is connected to the outer end of the disappearing shelf slide 48 above referred to, so that as the slide head 66 advances to the work, and with it the shearing and trimming dies as above explained, the nail supporting ledge formed by the projecting end of the said slide is caused to withdraw into the channel in its bed-block leaving the nail free to drop into the nail box as soon as otherwise disengaged. In the interval following the beginning of the reverse movement of the slide head, the setting tool and also the seating stop have become withdrawn so that the nail drops as soon as the shearing dies have left it. Thereupon the stripper moves toward the face of the die to discharge the snip of superfluous metal and the supporting ledge 48 is simultaneously returned, in readiness for the next nail and a repetition of the same operation. It will be understood that for each rotation of the terminal die rolls a freshly rolled nail is deposited in the drive-in trough and thereby presented to the setting and trimming tools. The parts in the drawing bearing the reference numerals 80, 81 and 82 are parts of the stop motion device, such as used in connection with die-rolls hitherto employed and as their construction and mode of operation are well-known, description thereof will not be necessary or useful in this specification.

While the invention has been above described with reference to a particular and preferred form of embodiment thereof it is to be understood that it is not limited to such form and that numerous changes in the form, proportions and mechanical structure of its several parts within the scope of the claims can be resorted to without departing from the invention.

In operation the continuous wire stock, of approximately the same cross-section as the heads of the finished nails, is supplied from the reel 4 and passes to the first pair of die rolls 30ª, by which it is given the conformation shown in the second illustration of the diagram contained in Fig. 26. Passing vertically downward below these rolls the partially formed wire is cut into separate blanks by the shearing means 33, 34, and the successive blanks thus severed pass downward through the first tube section 37 to the second pair of die rolls 30ᵇ and thence in succession through the other tube sections and die rolls, being progressively drawn by the latter as to their shank portions, until each blank is finally delivered by the terminal pair of rolls in the form of a full-sized but untrimmed nail. Thereafter there is no swaging or upsetting of the head because it is already of the proper cross-section, but the nail emerging from the delivery tube 16 is led to the drive-in trough 39 whence it is advanced endwise by the pusher 42 along the stationary trimming seat, which includes the vertical face of the block 49 and the fixed male point-trimming die 63. The nail is supported with its flat face against this vertical trimming seat by means of the disappearing ledge 48, over which the nail is advanced by the pusher in the movement just described. The advancing movement of the nail along the seat and ledge is definitely limited by the action of the stop lever 51, which is swung into operative relation to the trimming seat at the proper moment slightly before the conclusion of the feeding stroke of the pusher. The setting tool 57 now advances toward the face of the trimming seat and clamps the nail to the face of the block 49 with sufficient pressure to straighten the nail if crooked or to impart to it any desired condition of curvature or set. While the nail is thus held, the head-trimming die 62 and the female point-trimming die 65 advance and simultaneously finish the head and point. This movement of the slide 66 carrying the point-trimming die 65 causes the ledge 48 to recede into the block 49, so that when the cam shaft 45 causes the stop lever 51, the trimming dies and the setting tool 57 to recede the trimmed nail is left unsupported and consequently falls through the opening in the bed-plate shown in Fig. 16. After a slight period of lost motion the point-trimming slide 66 restores the shelf 48 to projected position in readiness to receive the next nail to be trimmed, after which the operations just described are repeated.

Claims:

1. A horsenail machine comprising a main frame having mounted and organized therein in combination, a series of pairs of die-rolls, the terminal pair thereof having full-sized nail cavities, a trimming seat, means for conducting the nail from said terminal die-rolls and placing it upon the seat, and one or more trimming tools coöperating with said seat to finish the nail thereon.

2. A horsenail machine comprising a main frame having mounted and organized therein a series of pairs of die-rolls the terminal pair thereof having fullsized nail-head cavities formed therein, and the initial pair thereof being adapted to operate on continuous nail-stock having substantially the cross-sectional size of the said nail-head cavities, in combination with a trimming seat, means for conducting the nail from the terminal die-rolls to said seat, and a trimming tool acting on the seated nail to finish the same.

3. A horsenail machine comprising a vertical series of die-rolls and means for delivering continuous nail stock from above downwardly through said die-rolls, in combination with nail-conducting means below the lowermost die-rolls, a stationary trimming seat to which the nail is conducted by such means, and means coöperating with said seat for finishing the nail thereon.

4. A horsenail machine comprising a main frame having mounted therein a series of die-rolls, the initial rolls thereof being adapted to operate on nail-stock of a cross-sectional size not less than that of the nail head and the terminal rolls having fullsized nail cavities, in combination with shearing means for trimming the heads and points of the nails and means for conducting nails from said terminal die-rolls to said shearing means.

5. A horsenail machine comprising the frame and the series of die-rolls mounted therein, having the initial rolls adapted to operate on nail stock of a cross-sectional size not less than that of the nail head and the terminal roll provided with full sized nail cavities, in combination with a setting tool operative to clamp and set the nail delivered by said terminal rolls and shearing means simultaneously operative thereon for trimming the head and point of the nail while the same is held stationary by the setting tool.

6. A horsenail machine comprising a series of die-rolls producing fullsized but untrimmed nails from continuous rod stock and provided with a delivery chute or tube, through which the nail passes to parts forming a trimming seat, in combination with such parts, means for defining a predetermined position of the nail thereon, and means for finishing the nail comprising a setting tool and shearing means all coöperating with the said trimming seat, said shearing means acting upon the nail while the same is held stationary by the setting tool.

7. A horsenail machine comprising a series of die-rolls operative to produce and deliver fullsized but untrimmed nails, a trimming seat for receiving such nails and means for defining the position of the nail thereon comprising a seating stop arranged to have abutment engagement with a point on the nail intermediate of its ends, and shearing means coöperating with said seat to trim and finish the nail seated thereon.

8. A horsenail machine comprising means for producing fullsized nails having untrimmed heads and shanks of the dimensions desired for the finished nail, a trimming seat and means for defining the position of the said nails thereon comprising a seating stop having an edge or corner adapted to have abutment engagement with the corner angle between the base of the head and the shank or blade of the nail.

9. In a horsenail machine, a series of die-rolls adapted to produce fullsized nails with the heads and shanks thereof having the cross-sectional shape and size of the finished nail, a trimming seat having a face for the flat side of the nail, means for placing the nails from said rolls thereon, and a seating stop spaced from said face by a distance equal to the thickness of the nail shank at its junction with the head and adapted to define the position of the nail on said seat.

10. In a horse-nail machine, a trimming seat provided with shear edges for the head and point of the nail, means for advancing an untrimmed nail to said seat and a stop for such nail disposed to engage the corner-angle formed by the head of the nail with the shank thereof, in combination with shearing means for trimming the nail against the seat.

11. In a horsenail machine, a trimming seat provided with shear edges for the head and point, respectively, of an untrimmed nail, a head-trimming die disposed at an oblique angle to the nail and coöperating with one of said shear edges and a point-trimming die coöperating with the other.

12. A horsenail machine comprising a main frame having mounted and organized therein in combination, a series of pairs of die-rolls, the terminal pair thereof having full-sized nail cavities, a trimming seat, means for conducting the nail from said terminal die-rolls and placing it upon the seat, a head-shearing die operative obliquely to said seat and setting and point-trimming dies also coöperating with the said seat and producing a finished nail.

13. In a horsenail machine, a trimming seat and means for defining the position of the nail thereon, shearing means operative upon the head and point of the nail seated on such seat and comprising an obliquely disposed head-trimming shearing die and a point-trimming die, in combination with a single operating means to which both of said dies are connected and by which they are caused to coöperate with said trimming seat.

14. In a horsenail machine, a trimming seat, head-trimming and pointing dies adapted for coöperation therewith, a slide-head on which one of said dies is carried, means independent of said slide-head for supporting the other die and an operating connection between the latter die and slide-head.

15. In a horsenail machine, a trimming seat, a slide-head carrying a point-trimming die adapted to coöperate therewith, an obliquely disposed head-trimming die connected to said slide-head for actuation thereby, and a setting tool mounted for coöperation with the trimming seat between the aforesaid trimming dies.

16. In a horsenail machine, a trimming seat, a point-trimming die and means for reciprocating the same, in combination with a head-trimming die obliquely disposed with respect to the point-trimming die and detachably connected for operation thereby.

17. In a horsenail machine, the combination with the trimming seat and means for placing the nail thereon, of a setting tool and a head-trimming tool obliquely disposed with respect thereto, both mounted to be engaged with the nail at substantially the same time and provided with rearward extensions by which they are actuated, the said rearward extensions being superposed the one over the other.

18. In a horsenail machine, the combination of a trimming seat having a vertical face, setting and head trimming tools arranged to operate in the horizontal plane of said seat and the one at an angle with respect to the other, and a point-trimming tool simultaneously operative upon the said nail.

19. In a horsenail machine, a trimming seat, a seating stop movable toward and from the same, a setting tool arranged to act in the same plane as said seating stop and a head-trimming die operative upon the nail in the said plane and intersecting the paths of movement of said seating stop and setting tool.

20. In a horsenail machine, a trimming seat, means for advancing a nail thereto from a point at one side thereof, a seating stop lever pivoted on the same side of said seat and movable laterally toward and from the same.

21. In a horsenail machine, a trimming seat, means for advancing a nail thereto, a seating lever pivoted adjacent to the said means and provided with a laterally projecting lip portion and means for actuating the said lever to swing the said lip portion toward and from the said seat.

22. In a horsenail machine, a trimming seat, means for advancing a nail thereto from one side, a seating stop lever pivoted adjacent said means and movable laterally toward and from the same, and provided with a part having a corner adapted for abutting engagement with the corner angle of the nail-head and shank.

23. In a horsenail machine, a seating stop adapted to engage the corner-angle between the head and shank of the nail and a shearing-die operative obliquely to the said nail and movable in the same plane as said seating stop and adapted to trim the top of the nail head.

24. In a horsenail machine, a horizontal trimming seat, a stop lever pivoted behind the same and provided with a depending lip portion, a rod provided with an upstanding setting tool operative adjacent to said lip portion and an obliquely disposed head trimming tool mounted in a guide-way disposed beneath the stop lever and above the setting tool rod and adapted to act in the same plane as said setting tool and seating stop.

25. In a horsenail machine, a trimming seat formed by the vertical face of a suitable block or plate and provided with a horizontal nail supporting shelf beneath said face, upon which shelf the nail rests lengthwise, a finishing tool coöperative with said trimming seat and means for retracting the said supporting ledge.

26. In a horsenail machine, a trimming seat formed by the vertical face of a fixed part and provided with a shelf or ledge beneath the same mounted for retractive movement through the plane of said face, in combination with finishing tools coöperating with the seat to finish the nail while the latter is held stationary on the seat and supported by the shelf, and means for retracting the said shelf or ledge to discharge the nail thereon.

27. In a horsenail machine, a drive-in trough and pusher and a trimming seat in line therewith formed by the face of a suitable plate or block, directing fingers on the end of the trough, and a disappearing nail support beneath said face, in combination with a stop for determining the position of the nail on said seat and means for finishing the nail thereon.

28. In a horsenail machine, a trimming seat formed by the face of a suitable plate or block, a slide confined by said plate or block and forming a nail supporting ledge for said seat, nail finishing tools coöperating with said seat to finish the nail while the latter is held stationary on the seat and supported by the shelf and means for sliding said ledge into its support.

29. In a horsenail machine, a trimming seat, a movable ledge adapted to support the nail lengthwise thereon against the trimming seat, and a finishing tool adapted to act on said nail, in combination with an operating connection between said tool and ledge to cause the latter to move from its nail supporting position.

30. In a horsenail machine, a trimming seat, a movable ledge adjacent the same and movable into and out of position to support the nail lengthwise thereon against the trimming seat, a finishing tool coöperating with said seat and means actuated by the said tool to move the ledge into its nail-supporting position.

31. In a horsenail machine, a trimming seat, a movable nail supporting ledge adjacent thereto, a spring finger opposite said ledge, and means for advancing a nail into seated position between said ledge and finger, in combination with a trimming tool operatively connected with said movable ledge to retract the same from engagement with the nail.

32. In a horsenail machine, a trimming seat provided with a movable ledge and a finger both adapted to guide and support the nail upon the seat, and provided also with shearing edges for the head and point of the nail, in combination with a seating stop, a setting tool and shearing dies coöperating with said seat to finish the nail thereon.

33. A horsenail machine comprising a main frame having organized therein a means for producing fullsized but untrimmed nails, a trimming seat disposed above an opening on the bed-plate of the frame, a movable ledge adapted to support the nail on said seat and until the ledge is retracted, in combination with shearing and setting tools coöperating with said seat to finish the nail while stationary on the seat and means for retracting the ledge to allow the nail to drop therefrom and through said opening.

34. A horsenail machine comprising a vertical series of die-rolls operative on stock of substantially the cross-sectional size of the finished nail heads, a train of gears for driving the rolls, and a cam-shaft driven by said train, in combination with a stationary trimming seat and means for conducting nails from the die-rolls to the seat, a seating stop for said seat, a setting tool and trimming dies adapted to coöperate with said seat, the said stop, tool and dies being all actuated by the said cam-shaft and adapted to produce a finished nail, the said trimming dies acting upon the nail while the latter is held stationary by the setting tool.

35. In a horsenail machine, a vertical stationary trimming seat, a nail-supporting ledge adjacent thereto, means for advancing the nails endwise along said ledge and seat, and nail-trimming mechanism coöperating with said seat to finish the nail thereon.

36. In a horsenail machine, a vertical trimming seat, a movable nail-supporting ledge adjacent thereto, means for placing a nail lengthwise on said ledge and against said seat, trimming mechanism coöperating with said seat, and means for removing said ledge from supporting relation to the nail so as to permit the latter to fall through a suitable discharge opening.

37. In a horsenail machine, a stationary trimming seat comprising the vertical face of a suitable block and a fixed male point-trimming die, a ledge for supporting a nail lengthwise thereon against said face and die, in combination with a reciprocatory setting tool and a reciprocatory female point-trimming die coöperating respectively with said face and fixed die.

38. In a horsenail machine, a stationary vertical trimming seat, a removable nail support below the same, means for advancing a nail endwise along said support and against said seat, a stop for limiting the advancing movement of the nail, and mechanism movable toward and from the trimming seat to finish the nail thereon.

39. In a horsenail machine, a trimming seat comprising the vertical face of a suitable block, means for advancing a nail endwise along said face, means for sustaining the nail in such position, a stop coördinated with said advancing means to move toward and from said face at proper times and adapted to have abutment engagement with the base of the head of the nail, in combination with mechanism for trimming the nail against the trimming seat and thereafter permitting its discharge.

40. In a horsenail machine, a stationary vertical trimming seat comprising the face of a suitable block and a fixed trimming die, a nail support adjacent said trimming seat, means for placing a nail lengthwise on said support and against said seat, and a reciprocatory trimming die coöperating with said fixed die.

In testimony whereof, I have signed this specification in the presence of two witnesses.

SOLOMON M. CUTTER.

Witnesses:
WILLIAM H. YOUNG,
LUTHER L. GAYLORD.